United States Patent
Palm

(10) Patent No.: US 6,543,721 B2
(45) Date of Patent: Apr. 8, 2003

(54) STRESSED-SKIN COMPONENT MADE OF METAL

(75) Inventor: Frank Palm, Munich (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 09/774,091

(22) Filed: Jan. 31, 2001

(65) Prior Publication Data

US 2001/0038057 A1 Nov. 8, 2001

Related U.S. Application Data

(63) Continuation-in-part of application No. PCT/DE00/01388, filed on May 3, 2000.

(30) Foreign Application Priority Data

May 31, 1999 (DE) .......................................... 199 24 909

(51) Int. Cl.[7] .................................................. B64C 1/00
(52) U.S. Cl. .................. 244/117 R; 244/131; 244/132; 244/123
(58) Field of Search ............................ 244/117 R, 119, 244/131, 132, 133, 123; 228/141.1, 152

(56) References Cited

U.S. PATENT DOCUMENTS

| 2,354,236 A | * | 7/1944 | Watter et al. ............... 244/123 |
| 2,458,686 A | * | 1/1949 | Davie, Jr. ................... 244/123 |
| 2,899,727 A | * | 8/1959 | Misfeldt ..................... 244/123 |
| 3,135,486 A | * | 6/1964 | Wing .......................... 244/123 |
| 5,423,123 A | * | 6/1995 | McQwilkin et al. ..... 29/897.32 |

FOREIGN PATENT DOCUMENTS

| CH | 224693 | 3/1943 |
| DE | 44 46 320 A1 | 7/1996 |
| DE | 196 39 667 C1 | 3/1998 |

OTHER PUBLICATIONS

US 2002/0006329 A1, yu et al, Jan. 17, 2002 (effective filing date Aug. 11, 1999).*

* cited by examiner

*Primary Examiner*—Galen L. Barefoot
(74) *Attorney, Agent, or Firm*—Crowell & Moring LLP

(57) ABSTRACT

A stressed-skin component is made of metal including a skinplate and integrated stiffening profiles, which skin component apart from the required rigidity also provides adequate crack advance behaviour and retained strength behaviour. The stiffening profiles in the base area comprise a thicker region of a profile base thickness; the thicker region having a reduced connection thickness at the connection with the skinplate. The profile base thickness is at least twice the connection thickness.

24 Claims, 3 Drawing Sheets

STRESSED-SKIN COMPONENT MADE OF METAL

CROSS-REFERENCE TO RELATED APPLICATION

This application is a continuation-in-part of PCT application Serial No. PCT/DE00/01388 filed May 3, 2000.

BACKGROUND AND SUMMARY OF THE INVENTION

This application claims the priority of German Patent Document 199 24 909.1 filed May 31, 1999 and PCT/DE00 01388 filed May 3, 2000, the disclosures of which a e expressly incorporated by reference herein.

The invention relates to a stressed-skin component made of metal with integrated stiffening profiles, in particular to a skinplate with stringers for aircraft Usually, aircraft fuselages are made from sheets of skinplate of aluminium alloys, riveted together. When designing aircraft fuselages, specified strength requirements have to be complied with. Apart from static strength and fatigue, these specifications also include compliance with prescribed crack advance behaviour and retained strength behavior. The design of aircraft fuselages reflects compliance with the above-mentioned requirement. For this reason, the design method of skinplates with riveted-on stringers has been applied to stressed-skin components of the exterior skin. This design method above all complies with the strict requirements for rigidity of the fuselage.

In the case of crack damage of the skinplate, with an assumed crack propagation in circumferential direction of the aircraft fuselage, the crack increases under operational loads, thus encountering a stringer. However, if this stringer is connected to the skinplate by riveting or bonding, the crack can usually propagate underneath the stringer without damaging the stringer in the process. Accordingly, there is relatively little impairment of the retained strength of the entire structure, and no failure of the construction is to be feared.

In order to save production costs and operating costs, endeavours have been made to replace riveting of the stringers by weld connections (DE 196 39 667 C1). With this method it must be taken into account that a crack occurring transversely to a welded-on stringer can propagate equally in the skinplate and in the stringer, consequently severely cracking or even through-cracking the stringer. For this reason, the crack advance behaviour and retained strength behaviour of a stressed-skin component damaged in this way, are inferior to those of a riveted stressed-skin component. In addition, when welding the usual stringers by means of laser beam welding techniques used for this, time and again cracks occur in the weld seams; such cracks result from impediments to shrinking during cooling off of the weld seam. The use of weld filler metal to improve the solidification condition, can only partly compensate for this disadvantage It is the object of the invention to create a cost-effective stressed-skin component made of metal with integrated stiffening profiles, which skin component apart from the required rigidity also provides adequate crack advance behaviour and retained strength behaviour.

According to the invention, this object is met by a stressed-skin component made of metal, comprising a skinplate and stiffening profiles, characterized in that the stiffening profiles in a base area comprise a thicker region of a profile base thickness; in that towards the connection juncture the thicker region has a reduced connection thickness; and in that the ratio of profile base thickness to connection thickness is at least two. Developments of the invention are described herein and in the claims.

Advantageously, the invention applies a geometry-related local reduction in mechanical tension loads at the front of a crack penetrating a stiffening profile of the stressed-skin component. The invention is also based on the recognition that in order to achieve the required rigidity behaviour, the forces which have to be absorbed by the stringer rivets in the case of riveted-on stringers, are relatively small. Often a single row of rivets is adequate for stringer attachment. Therefore, in the case of welded-on stiffening profiles, the depth of the weld seam can be reduced. In this way, shrinkage is improved and a reduction in hot crack formation is achieved.

Reduced depth of the weld seem provides an additional advantage in that increased welding speeds can be achieved, resulting in a reduction in thermal distortion of the stressed-skin components, caused by the weld temperature.

Below, embodiments of the invention are described in more detail by means of the drawing.

DETAILED DESCRIPTION OF THE DRAWINGS

Figure 1:
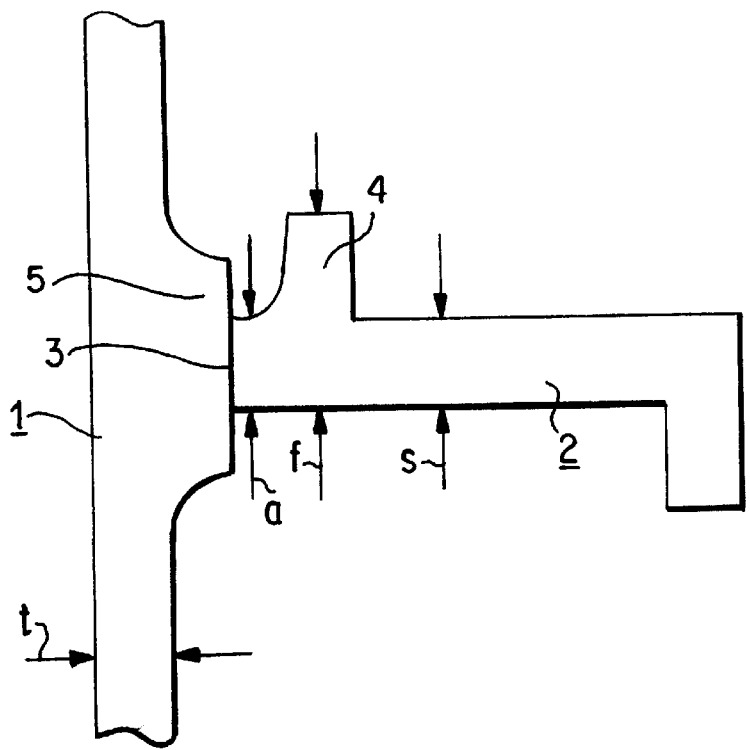
FIG. 1 shows a section of a stressed-skin component with a welded-on stiffening profile, comprising an increased profile thickness in the base area.

The stressed-skin component for an aircraft fuselage, shown in FIG. 1, comprises the skinplate 1 and stiffening profiles 2 welded onto said skinplate 1, spaced apart from each other. For reasons of clarity, the section of the stressed-skin component shown in FIG. 1 shows only one of several stiffening profiles.

In the embodiment shown the skinplate 1 and the stiffening profiles 2 comprise an AlMgSiCu alloy: but the solution according to the invention can also be used with other metallic materials. In the embodiment shown, the stiffening profiles 2 are stringers, but the invention can also be applied in the case of other stiffening profiles which can be exposed to a crack load emanating from a skinplate.

In the examples shown, the thickness of the skin plate t and the profile thickness s are essentially the same: for example they are approx. 1.6 to 2 mm. The stiffening profiles 2 are welded onto the skinplate 1 by means of $CO_2$ laser beam welding. Welding takes place with two radiation sources from both sides of the connection juncture 3, at a very shallow angle, with filler wire being used. In the resulting penetration welding of the connection juncture 3, each laser beam penetrates at least 1 mm. This makes it possible to weld at a speed of between 6 and 10 m/min. With increased laser performance, the weld speed can even exceed 10 m/min.

To impede crack propagation emanating from the skinplate 1 in the stiffening profile 2, the base area of said stiffening profile comprises a thicker region 4. As a result of the thicker region 4, the ratio of the connection thickness a to the profile base thickness f is altered so that the tension intensity to crack propagation and consequently the crack advance speed in the stiffening profile 2 is as low as possible. The ratio f/a should exceed or equal 2 so that crack propagation is slowed down considerably or the crack is deflected to the longitudinal direction of the profile.

In the embodiment shown, the skinplate 1 is prepared for welding as a rolled sheet with the desired final dimensions. At the places where the stiffening profiles 2 are to be welded on, a socle 5 is formed by "chemical milling". The reason for this is that for use of the stressed-skin component in aircraft construction, strength specifications require that the heat affected zone which after welding irreversibly remains in the skinplate as a result of metallurgical processes, must not protrude into the nominal skinplate thickness t.

The solution according to the invention is not limited to the shape of the thickening 4 shown in FIG. 1. The shape shown in FIG. 1 corresponds to a Z form which is advantageous to produce. But the thicker region 4 could for example also symmetrically enlarge the base limb of the stiffening profile 2.

According to the invention, a further supportive measure for suppressing crack propagation into the stiffening profile (2) is achieved in that the ratio of the profile base thickness (f) to the skinplate thickness (t) exceeds/equals 2, thus also influencing the ratio of the tension intensities.

Figure 2:
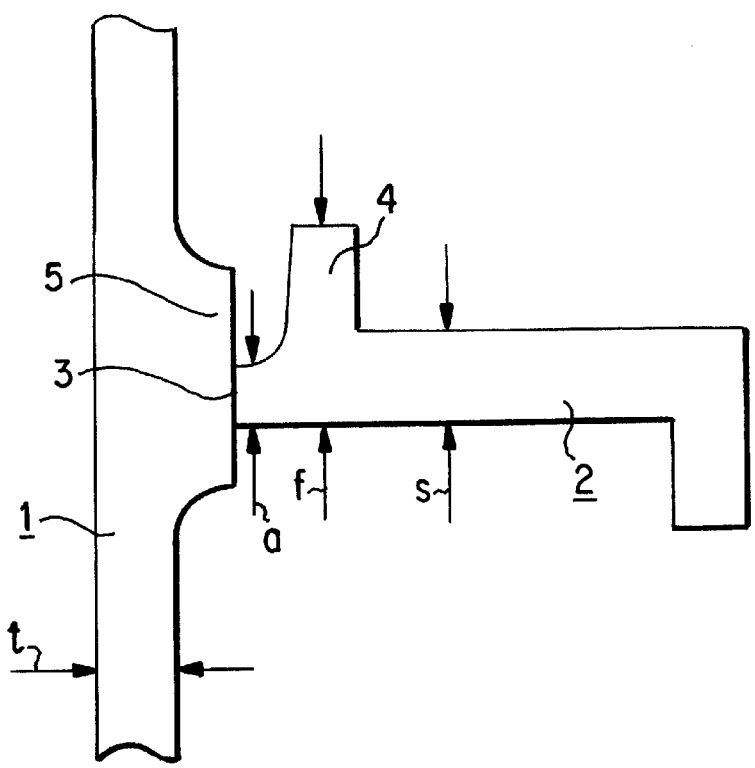
FIG. 2 shows a section of a stressed-skin component with a welded-on stiffening profile, comprising an increased profile thickness in the base area and a reduced connection thickness.

The embodiment shown in FIG. 2 corresponds to the embodiment previously described in the context of FIG. 1 except that it has a reduced connection thickness a. In the previously described embodiment, the connection thickness a corresponded to the profile thickness s. Due to the light load acting on the weld seam, a reduction in the connection thickness a can be made without any problems. A reduction in the connection thickness to half or to a third, can be made without generating excessive line tension. Such reduction has a multiple positive effect: apart from enhancing the previously described reduction in crack propagation, or generating a crack deflection, due to the reduced depth of the weld seam, less shrinkage tension occurs during solidification of the weld seam and consequently less hot-crack formation occurs. The depth of the weld seam of the fully welded-through connection juncture 3 is reduced as the connection thickness a is reduced. Moreover, a reduction in depth of weld seams makes it possible to increase weld speeds.

Figure 3:
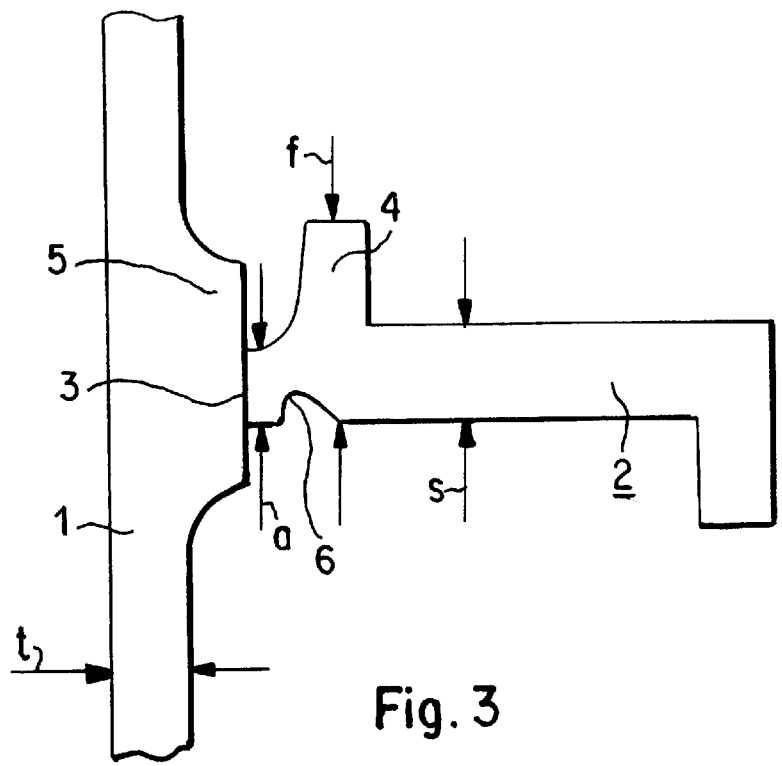
FIG. 3 shows a section of a stressed-skin component with a welded-on stiffening profile, comprising an increased profile thickness in the base area and a reduced connection thickness, and in addition a notch.

FIG. 3 shows an embodiment which corresponds to the embodiment described in FIG. 2, and in addition, in the region of the profile base comprises a notch 6 for further reduction of the rigidity of the stiffening profile 2 in the region of the connection juncture 3. In this way the profile base provides less resistance to the shrinkage forces during welding, thus reducing the danger of hot crack formation.

The notch 6 can be located on one side only, for single-fillet welding, as shown in FIG. 3, or it can be located on both sides of the profile base, for welding on both sides.

The measure of forming notches as described above, to reduce the stiffness of the profile base, can also be applied to the embodiment according to FIG. 1 in which the connection thickness a is not reduced in relation to the profile thickness s.

Apart from forming a notch, it is also possible to bring about the desired effect by introducing local compression strain. To this purpose a compression notch is made instead of a notch by rolling. The inherent compressive stress generated in this way in the profile foot, cancels itself out against the tension contraction stress, thus reducing the danger of hot cracks.

Figure 4:
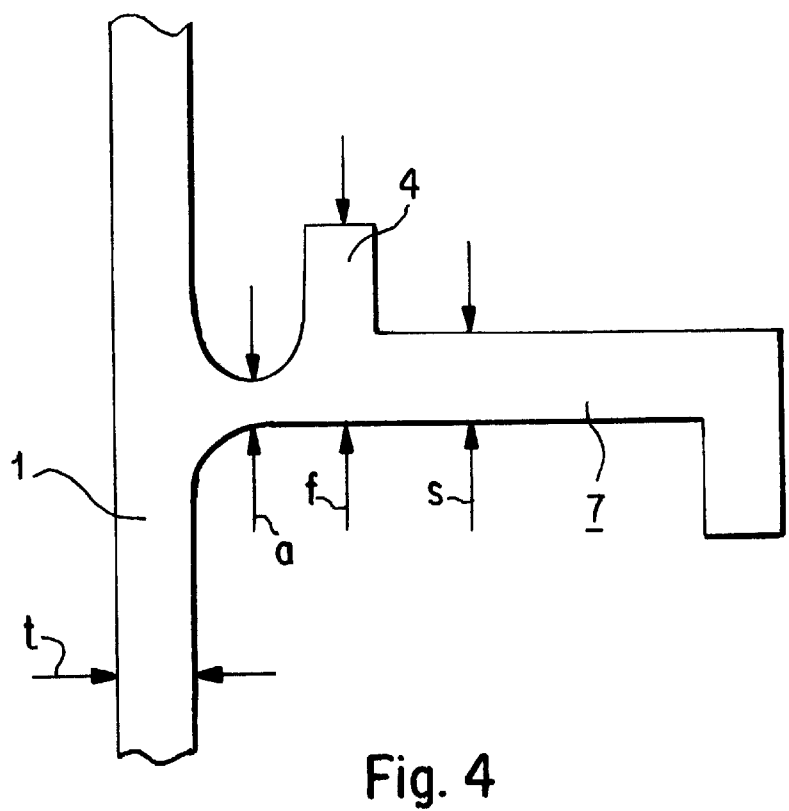
FIG. 4 shows a section of a stressed-skin component which is made as an extruded profile.

In contrast to the stressed-skin component of the embodiments described above, the stressed-skin component shown in FIG. 4 is not made by welding but instead by extrusion of a monolithic component comprising skinplate and stiffening profiles. This production method causes less expenditure than does production with welded-on stiffening problems. The problems concerning structural behaviour, in particular concerning retained strength when damaged, are much the same as those encountered in welded stressed-skin components. Accordingly, the solution characteristics of optimising the ratio of profile base thickness f to connection thickness a, as mentioned above in the context of FIGS. 1 and 2, can also be applied to the creation of such an embodiment. The section of an embodiment shown in FIG. 4 shows an extruded profile 7 which is optimised in regard to the crack advance behaviour by forming a thicker region 4 in the stiffening profile. Again the ratio of connection thickness a to profile base thickness f is decisive.

While the production of a complete stressed-skin component by means of a large extruded profile is technically possible, it causes some production problems, in particular in the case of small skinplate thickness t, as far as meeting dimensional tolerances and the prevention of surface faults are concerned. It is easier to press off narrow extruded profiles with for example 3 or 4 stringers and then to join them to complete stressed-skin components by means of butt welding or riveting. Butt welding can be carried out as arc welding, laser welding, electron-beam welding or as friction-agitation welding.

As an alternative to the use of extruded profiles 7, small stressed-skin components with few stiffening profiles (2) can also be milled from the solid block and then be welded together or riveted together to form a larger stressed-skin component.

Figure 5:
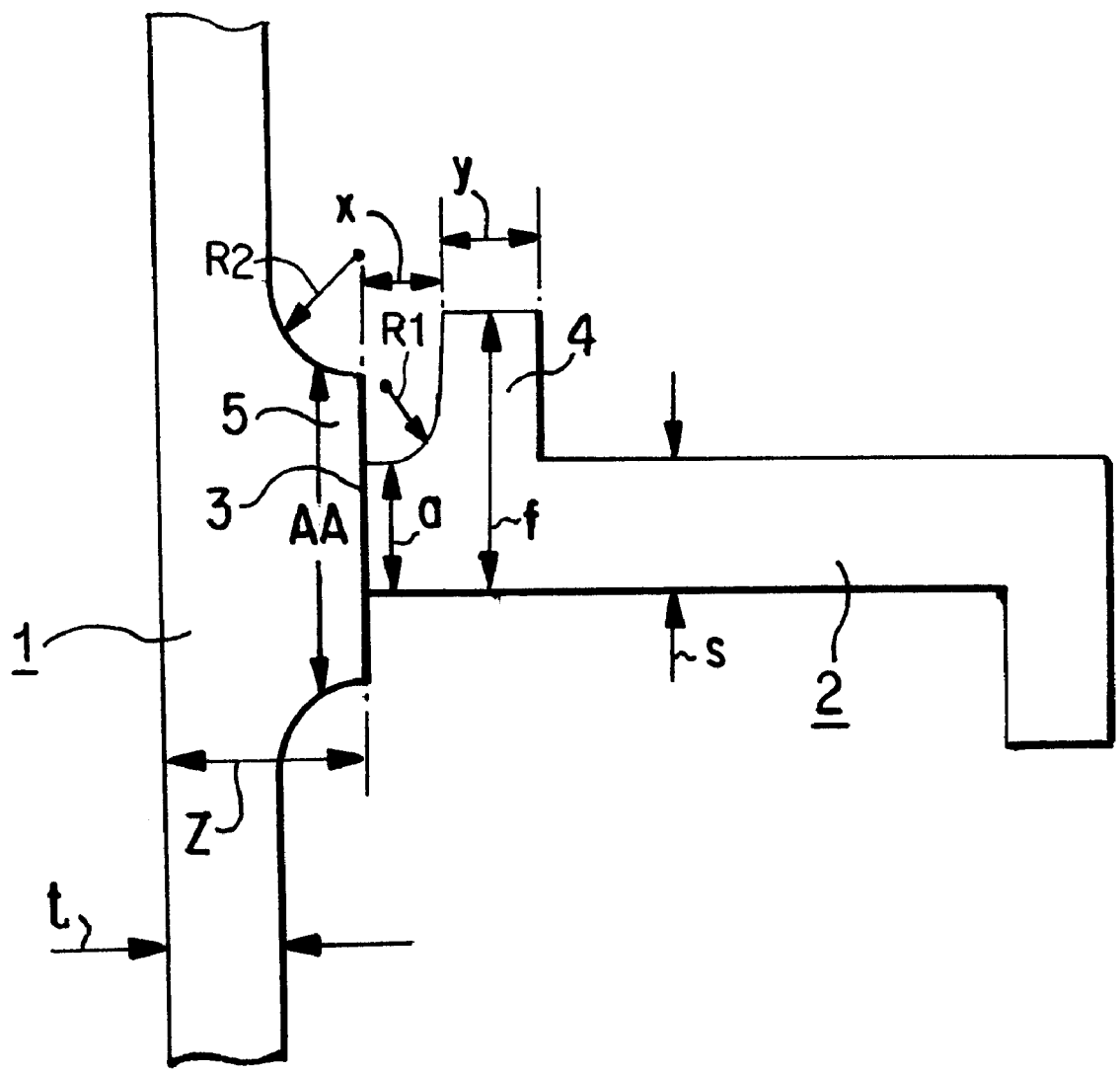
FIG. 5 is a view similar to FIG. 1, showing additional dimensional features.

FIG. 5 is similar to FIG. 1, supplemented to schematically depict further dimensional features for preferred embodiments of the invention. "Z" represents the local thickness of the aircraft skin at the location of the stiffening profile 2 welded thereto. "Y" represents the thickness in a direction transferred to the skinplate of the thicker region 4 at the profile location of dimension f. "X" is the local distance between the aircraft skin connection juncture 3 and the thicker region 4 of the stiffening profile, "AA" is the plateau width of the local skin to which the stiffening profile 2 is attached. Local radii $R_1$ and $R_2$ are as shown. In preferred embodiments, these dimension are in the following ranges:

Z is between 1.20 mm and 10 mm

Y is between 1.50 mm and 20 mm

X is between 2.50 mm and 25 mm $R_1$ is not smaller than 1 mm (if the local aircraft skin thickness Z and overall thickness t are the same, $R_1$ would=∞

$R_2$ is between 0.1 mm and 25 mm.

AA is between 0 and 100 mm (this means a plateau could be provided or not).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stressed-skin component made of milled or extruded metal, comprising:
   a skinplate,
   stiffening profiles, welded to the skinplate,
   wherein the stiffening profiles in a base area include a thicker region of a profile base thickness,
   wherein the thicker region is reduced to a connection thickness at its side facing the connection juncture, and
   wherein the ratio of the profile base thickness of the thicker region to the connection thickness is at least two.

2. A stressed-skin component according to claim 1, wherein the connection thickness is smaller than or equal to the profile thickness of the non-thickened stiffening profile at a side thereof facing away from the thicker region opposite the connection juncture.

3. A stressed-skin component according to claim 1, wherein in that the rigidity of the stiffening profile in the region of the connection juncture is reduced by one or two opposing notches.

4. A stressed-skin component according to claim 1, wherein, in the stiffening profile in the region of the connection juncture a compression notch is generated by rolling.

5. A stressed-skin component according to claim 1, wherein the ratio of profile base thickness to the skinplate thickness is at least two.

6. A stressed-skin component according to claim 2, wherein the stressed-skin component comprising the skinplate and stiffening profiles is made by milling from a solid block.

7. A stressed-skin component according to claim 1, wherein the stressed-skin component comprises several smaller, welded stressed-skin components, extruded profiles or milled stressed-skin components, and is assembled to form a larger stressed-skin component by means of butt welding or riveting.

8. A stressed-skin component according to claim 1, wherein the stressed-skin component comprising the skinplate and stiffening profiles is made by milling from a solid block.

9. A stressed-skin component according to claim 1, wherein the stressed-skin component comprises several smaller, welded stressed-skin components, extruded profiles or milled stressed-skin components, and is assembled to form a larger stressed-skin component by means of butt welding or riveting.

10. A stressed-skin component according to claim 1, wherein the stressed-skin component is used to construct an aircraft fuselage, produced from an aircraft-grade Al alloy, and
    wherein the stiffening profiles are connected as stringers to the skinplate.

11. A stressed-skin component according to claim 2, wherein the rigidity of the stiffening profile in the region of the connection juncture is reduced by one or two opposing notches.

12. A stressed-skin component according to claim 2, wherein, in the stiffening profile in the region of the connection juncture a compression notch is generated by rolling.

13. A stressed-skin component according to claim 2, wherein the ratio of the profile base thickness to the skinplate thickness is at least two.

14. A stressed-skin component according to claim 3, wherein the ratio of the profile base thickness to the skinplate thickness is at least two.

15. A stressed-skin component according to claim 4, wherein the ratio of the profile base thickness to the skinplate thickness is at least two.

16. A stressed-skin component according to claim 2, wherein the ratio of the profile base thickness to the skinplate thickness is at least two.

17. A stressed-skin component according to claim 3, wherein the ratio of the profile base thickness to the skinplate thickness is at least two.

18. A stressed-skin component according to claim 4, wherein the ratio of the profile base thickness to the skinplate thickness is at least two.

19. A stressed-skin component according to claim 13, wherein the ratio of the profile base thickness to the skinplate thickness is at least two.

20. A stressed-skin component according to claim 2,
    wherein the stressed-skin component is used to construct an aircraft fuselage produced from an aircraft-grade Al alloy, and
    wherein the stiffening profiles are connected as stringers to the skinplate.

21. A stressed-skin component made of milled or extruded metal, comprising:
    a skinplate, and
    a stiffening profile welded to the skinplate at a respective connection juncture,
    wherein the stiffening profile includes a first section joining the skinplate which has a smaller thickness than a second section spaced from the first section with a ratio of the thickness of the second section to the first section being at least two.

22. A stressed-skin component according to claim 21, wherein the second section is spaced from the connection juncture by a distance of between 2.5 mm and 25 mm.

23. A stressed-skin component according to claim 21, wherein the stressed-skin component is used to construct an aircraft fuselage produced from an aircraft-grade Al alloy, and wherein the stiffening profiles are connected as stringers to the skinplate.

24. A method of making a stressed-skin component made of milled or extruded metal, comprising:
    a skinplate, and
    a stiffening profile welded to the skinplate at a respective connection junctures,
    wherein the stiffening profile includes a first section joining the skinplate which has a smaller thickness than a second section spaced from the first section with a ratio of the thickness of the second section to the first section being at least two,
    said method comprising welding the stiffening profiles to the skinplate at the respective connection junctures.

* * * * *